United States Patent [19]
Estrada

[11] 3,974,780
[45] Aug. 17, 1976

[54] CHANGEABLE GAUGE RAILING TRUCK
[75] Inventor: Henry F. Estrada, Havertown, Pa.
[73] Assignee: The Budd Company, Troy, Mich.
[22] Filed: July 8, 1974
[21] Appl. No.: 486,545

[52] U.S. Cl. ............................ 105/178; 104/32 R; 105/182 R; 188/58; 188/59; 295/36 R
[51] Int. Cl.² ................ B60B 35/10; B60B 37/04; B61F 13/00; B61H 1/00
[58] Field of Search ............... 104/32 R, 32 A, 33; 105/178, 182 R; 188/58, 59; 295/5, 8.5, 36 R, 37, 1, 36 A, 38, 39

[56] References Cited
UNITED STATES PATENTS

| | | | |
|---|---|---|---|
| 2,293,975 | 8/1942 | Eksergian | 188/59 |
| 2,294,268 | 8/1942 | Baselt | 188/58 X |
| 2,727,780 | 12/1955 | Lorig et al. | 295/36 R |
| 2,908,230 | 10/1959 | Dean | 105/182 R |

FOREIGN PATENTS OR APPLICATIONS 143   1/1882   United Kingdom ................... 295/36

*Primary Examiner*—L. J. Paperner
*Assistant Examiner*—Howard Beltran

[57] ABSTRACT

Railway truck having side frames at a fixed lateral spacing with each side frame axle bearing support located between two track width locations to be accommodated, the side frames having universal-movement retaining mountings for replaceable rigid wheel-axle bearing units which provide mounting means for wheels inside the side frames for narrow gage track and mounting means for wheels outside the side frames for wide gage track and means for mounting brake disks at the same space location outside the side frames when wheels are located either inside or outside the side frames.

1 Claim, 5 Drawing Figures

CHANGEABLE GAUGE RAILING TRUCK

BACKGROUND

Heretofore trucks have been proposed for use on tracks of different gage width. Some have used separable side frames and separate axle parts; some have used separable axle parts slidable in side frames; some have used wheels slidable on axles; some have used separable trucks for four-rail tracks; and some have used shiftable wheel-axle units swingable into position for alternate use. But so far as is known, none has provided for gage shift while maintaining side frames at fixed width apart and axle units of fixed length with the same fixed bearing supports in the frames.

SYNOPSIS OF INVENTION

According to the present invention a truck is provided which has side frames and axle bearing mountings at a fixed distance apart, the spacing being intermediate two track gage widths to be accommodated. The axles, of fixed length and fixed-width bearing portions, are provided with large-diameter portions for the pressed-on mounting of inner narrow gage wheels, intermediate diameter portions for the bearing rings, and smaller diameter portions for the pressed-on mounting of outer wide gage wheels. Brake disks are mounted at a fixed distance apart for either track gage spacing, being attached to the outer wheels when used for wide gage track and being attached to hubs which are pressed on the wide wheel positions when inner narrow gage wheels are used.

This arrangement provides for the use of a truck of the type disclosed in the patent of W. B. Dean, U.S. Pat. No. 2,908,230, Oct. 13, 1959, which has given good service on light weight high speed cars. These trucks have rigid side frames with rigid spiders turnable in various directions in universal fashion about a king post, removable caps for securing axle bearing assemblies, outboard mounted disk brake units, and air spring bolster supports.

DRAWINGS

The objects of the invention, as well as various features of novelty and advantages, will be apparent from the following description of an exemplary embodiment, reference being made to the accompanying drawings thereof, wherein.

SPECIFIC EMBODIMENT

Figure 1:
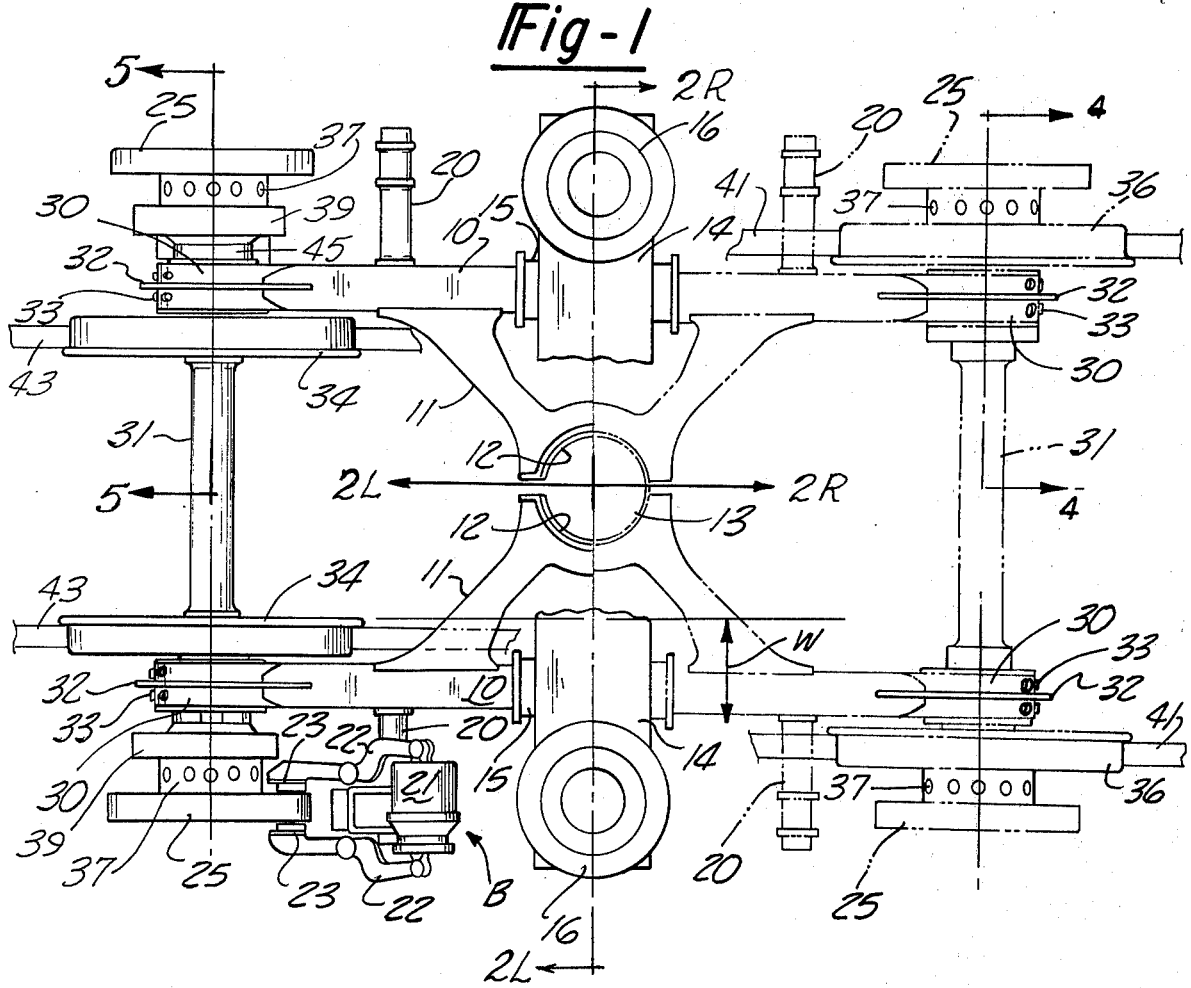
FIG. 1 is a composite plan view of a truck embodying the invention, the left side showing narrow gage wheels mounted on the axle and the right sid e showing wide gage wheels mounted on the axle.
Figure 2:
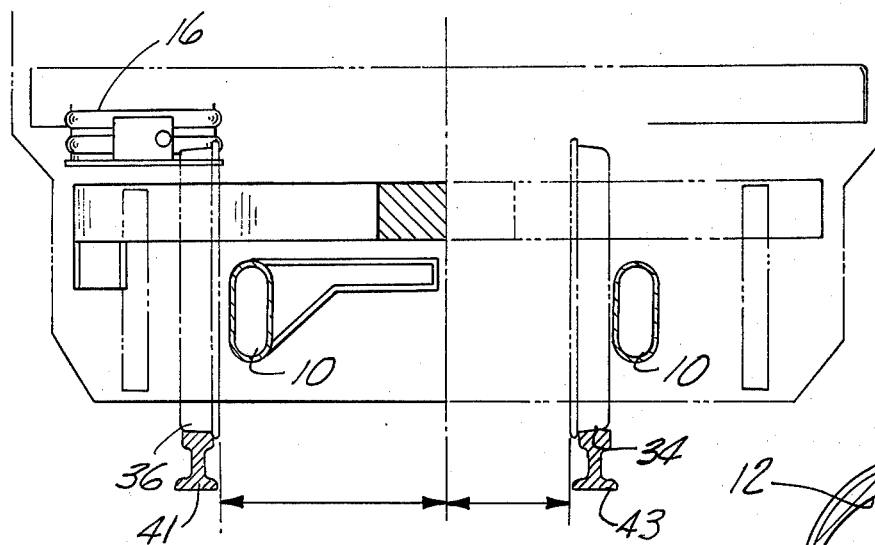
FIG. 2 is a view taken with the half illustrated on the left being a view of the top half of the right side of FIG. 1 taken along lines 2R—2R and the half illustrated on the right side being a view of the bottom half of the left side of FIG. 1 taken along lines 2L—2L.
Figure 3:
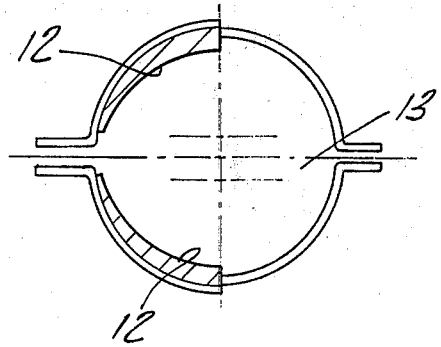
FIG. 3 is an enlarged view of the central cavity arrangement illustrated in FIG. 2.
Figure 4:
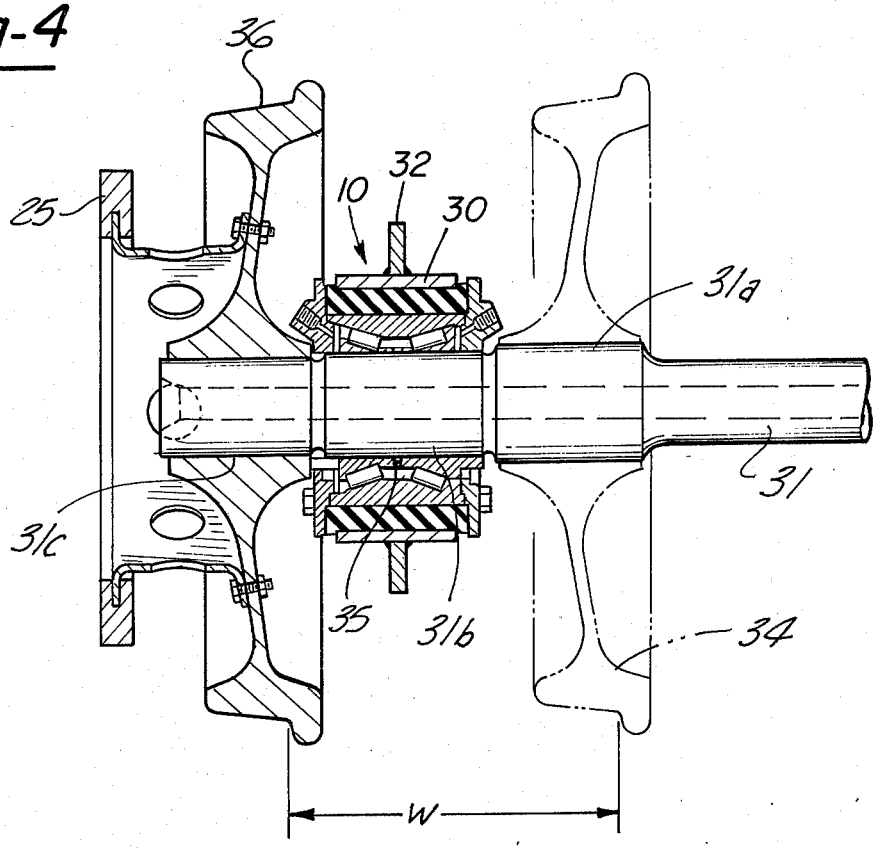
FIG. 4 is a partial vertical transverse section taken on the line 4—4 of FIG. 1 showing narrow gage wheels in broken lines and wide gage wheels in full lines.
Figure 5:
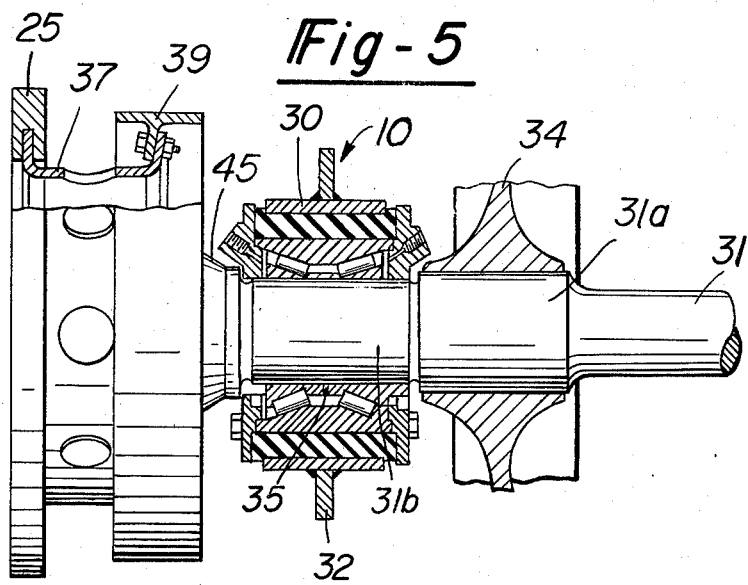
FIG. 5 is partial vertical section view taken along lines 5—5 of FIG. 1.

Except for the axle, wheel ad brake disk arrangement hereby provided, it will be assumed that the truck assembly is substantially similar to that shown in U.S. Pat. No. 2,908,230 referred to above. With this assumption, only so much of the whole truck assembly is shown in the present drawings as is necessary to illustrate the application of the present improvements to the truck and to show how the truck features contribute to the application of the present improvements.

Referring to all of the drawings, rigid side frames 10 include integral rigid spiders 11 which have mating concavities 12 which are loosely connected about a king post disposed to be inserted into an area 13 of a truck bolster 14. This permits the side frames to turn and weave about the king post while retained together by means, not shown. The truck side frames have anti-wear pads 15 supporting the bolster 14 for necessary turning and weaving movements. Air springs 16 provide support for a car body bolster on the truck bolster 14.

Stub brackets 20 rigidly secured to the outboard sides of the truck side frames, as by welding, support disk brake actuating units B, each comprising a fluid-actuated power unit 21, operating levers 22, and brake shoe units 23. The brake shoes act on disks 25 secured on the axles. For simplicity, only one brake actuating unit B is shown herein.

At each end of the truck side frames 10 there are provided bearing supports 30 which furnish universal movement for the axles 31 needed for the weaving movements of the side frames. The bearing units are removably retained by end plates or caps 32 held by bolt members 33, as in the patent.

Each axle 31 has large diameter portions 31a within or inboard of the bearing mounting on the side frames to receive inner narrow gage wheels 34 with a press fit thereon, the inner diameter of the inside wheels being sufficiently large to pass over all outer portions of the axle.

Intermediate-diameter portions 31b are adapted to have an inner bearing ring or sleeve 35 press-fitted thereon after the inner wheels have been secured on the axle — that is, when inner instead of outer wheels are used. The whole bearing assembly of inner ring, outer ring and bearings my be pressed on as a unit.

Outer small-diameter portions 31c of smallest diameter are provided for the press-fit thereon of outer wheels 36, when outer wheels are desired for wide-gage track 41 width, or for mounting hubs 37 to spacer elements 39 for carrying the brake disks 25 when inner wheels are desired for narrow gage track 43 width. Ground brush holders 45 are disposed between the frames 10 and the spacer elements 39 but are not related to the present invention. When outer wheels are used the brake disks may be secured to them by bolts, as in the patent; and when inner wheels are used the brake disks may be secured to the hubs 37 by bolts in like manner. In all cases the disks are located in the same outboard position and serve without change in the location or action of the brake actuating units B.

In FIG. 1 the line W with the arrows at the ends indicates half the difference in width between narrow and wide gage track widths. It is seen that in all cases the truck side frame bearing mountings lie within the length of the line W. As an instance of specific widths to be accommodated, the narrow gage width is 1 meter (39.37 inches) and the wide gage width is 1.6 meters (62.99 inches) making the space W 0.3 meters (11.81 inches) which is well able to take the width, i.e., length along the axle axis, of the frame-axle bearing supports 30.

When the truck is to be used on wide gage track (if previously used on narrow gage track) the axles are removed from the truck by removing the caps 32 and press-fitting the outer wheels on the axle portions 31c, removing inner wheels first, if present, then securing the brake disks 25 to the outer sides of the wheels. The wheel-axle units are then replaced and secured by the caps 32.

When the truck is to be used on narrow gage truck the axles are in like manner removed from the truck, the outer wheels removed (if present) and the inner wheels force-fitted on the large portions 31a, after which the bearing sleeves are force-fitted on the portion 31b and the disk hub members 37 are force-fitted on the portions 31c, and the disks 25 attached.

Of course, if the truck is initially assembled for either narrow or wide gage track it will not be necessary to remove one gage set of wheels before assembling the intended set.

When either narrow gage or wide gage wheels are assembled on the axles the entire assembly is as rigid and secure as with the other and there are no shiftable parts to wear or get out of order as in previously known constructions. The parts are all standard, the axles the same for any installation, and the conversion can readily be made in any ordinary railway shop.

While one enbodiment of the invention has been described for purposes of illustration, it will be understood that there may be various embodiments and modificatios within the general scope of the invention.

I claim:

1. A railway truck adapted for use on relatively wide and narrow gage tracks with respect to each other, comprising in combination, side frames, axle-bearing units, releasable axle retaining means adapted to mount said axle-bearing units to said side frames, and axle units adapted to be retained by said axle-bearing units, each respective side frame being positioned between the adjacent rails said axle units dimensioned with large diameter portions to receive wheels on the inboard sides of said side frames when said truck is used with said relatively narrow gage track, intermediate-diameter portions to receive bearing sleeves to hold said axle-bearing units, and small-diameter portions to receive wheels on the outboard side of said side frames when said truck is used with said wide gage track, means for mounting brake disks on said axle located outboard of said side frames at the same transverse positions when said truck is used on either gage tracks, and brake operating units mounted on the outside of the side frames in the same transverse positions when said truck is used with either gage tracks.

* * * * *